Figure 1:
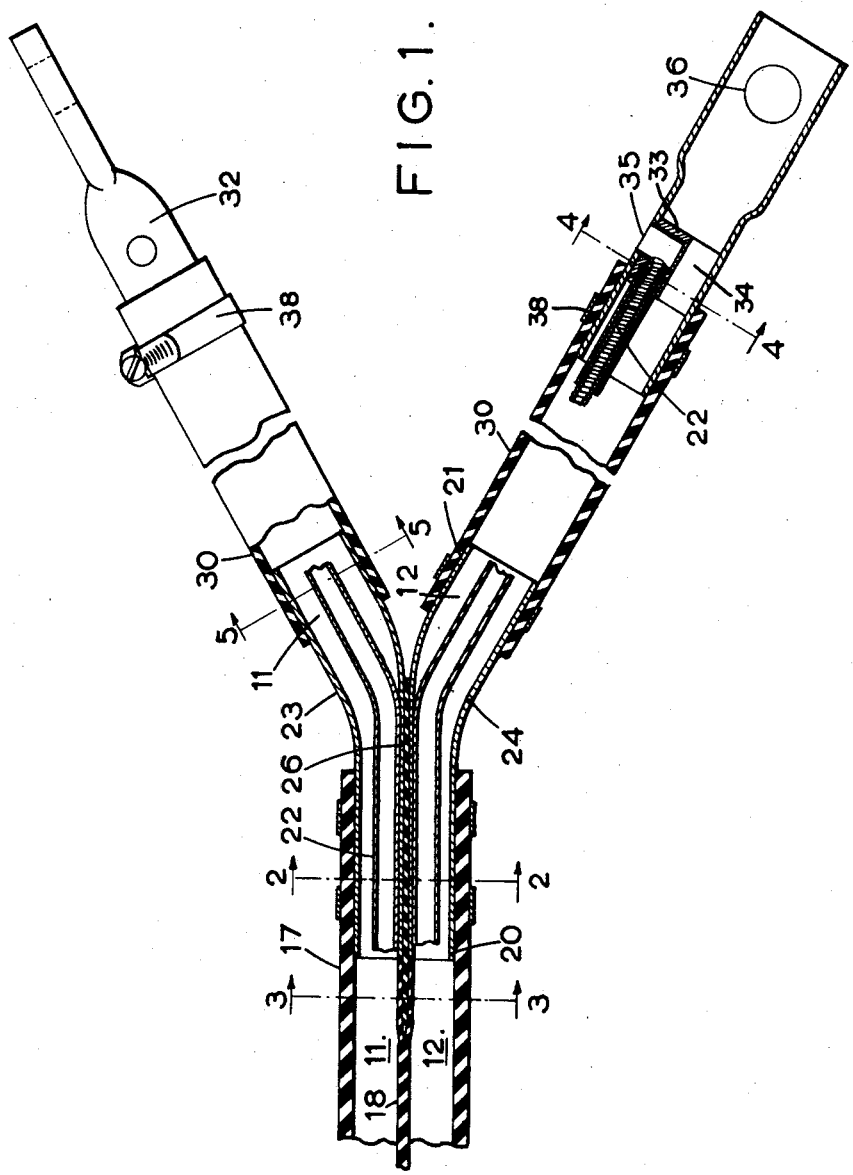

June 14, 1960

T. F. TRIBE 2,941,023

WELDING CABLES

Filed Feb. 20, 1956

2 Sheets-Sheet 1

INVENTOR:
THOMAS FRANCIS TRIBE
BY
Richardson, David and Nordon
ATTORNEYS.

June 14, 1960 T. F. TRIBE 2,941,023
WELDING CABLES
Filed Feb. 20, 1956 2 Sheets-Sheet 2
FIG.2. FIG.3.
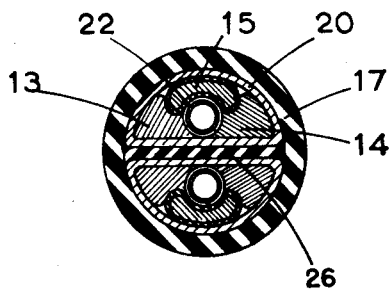
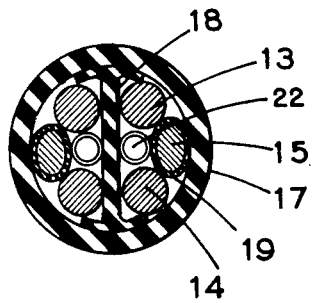
FIG.4. FIG.5.
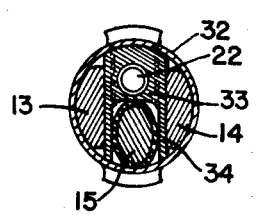
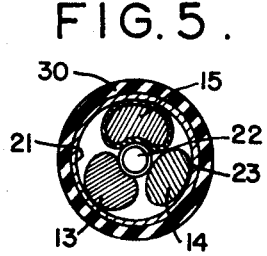
FIG.6.
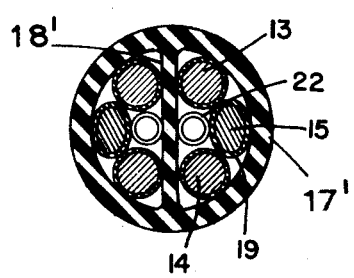
INVENTOR:
THOMAS FRANCIS TRIBE
BY
Richardson, David and Nardon
ATTORNEYS.

United States Patent Office 2,941,023
Patented June 14, 1960

2,941,023
WELDING CABLES

Thomas F. Tribe, Oxford, England, assignor to British Federal Welder and Machine Company Limited, Worcester, England, a British company Filed Feb. 20, 1956, Ser. No. 566,682

Claims priority, application Great Britain Aug. 31, 1955

2 Claims. (Cl. 174—15)

This invention relates to welding cables of the kind in which the cables are so arranged and interconnected that, on the passage of welding current, the forces of mutual induction are so constrained and equated that the cables cannot kick apart, as is usual with the more common type of cable. Such cables are known as kickless cables and have the great advantage that they have a much longer working life since they are not subjected to violent movement, they are handled and connected to a transformer or welding machine with great facility and they ensure an improved power factor of the source of supply. The invention is also concerned particularly with terminal heads or connectors for such cables.

The object of the invention is to provide a kickless welding cable in which the terminal heads or connectors may be connected very readily to the terminals of a welding transformer or of a welding machine, such as a welding gun without the use of separate connecting leads known as jumpers, and in such a way that the end lengths of the cable are freely movable with respect to each other.

According to the invention a kickless welding cable consists of two multi-core or bunched cables, the cores of each cable running straight through or being twisted together along their lengths and the cables also running straight through or being twisted along their lengths but electrically separated by a flexible insulating web, the cables and web being encased in a common flexible insulating sheath, said sheath terminating a predetermined distance from the end of the cable whence the cables are divided by a Y-shaped copper tube to extend individually to terminal heads or connectors.

The Y-shaped copper tube preferably consists of a pair of tubes each deformed over a portion of its length to be of semi-cylindrical cross-section and opening out over the remainder of its length into a circular cross-section. The cylindrical portion is bent, for example, at an angle of 15° with respect to the semi-cylindrical portion, and these semi-cylindrical portions of the tubes are laid back-to-back. The semi-cylindrical portions, back-to-back, are inserted into the common flexible insulating sheath and the multi core or bunched cables are led separately through the limbs of the Y-tube. Each branch cable is then encased in its own flexible insulating sheath and secured to a terminal head or connector.

Each terminal head or connector consists of a copper tube into which is inserted a copper block having spaced limbs to divide the tube into three zones. This block is placed intermediately of the length of the tube. The cable is placed in the tube, with the coolant tube terminating at the copper block, and the cable cores passing through and by the copper block to terminate at the end of the tube.

The tube is then deformed, for example, in a power press, over the length beyond the copper block to the end of the tube, to present a flat or spade-like connector portion, the cores being sandwiched firmly in this portion to connect the cable in intimate electrical contact with the terminal head. If desired, the cable cores may be additionally soldered in the terminal head.

The common flexible insulating sheath is secured to the Y-tube and the individual end insulating sheaths are connected to the Y-tube and the terminal heads, by means of spring or screw clips.

Each terminal head after deformation is drilled to take a bolt for attachment of the spade-like portion to a transformer or a welding machine and also drilled to give access to the flexible coolant conduit terminating at the copper block.

The cable may have terminal connectors as described at each end or if desired the one end may be as described and the other end may be as shown and described in my copending application, Serial No. 566,683, filed February 20, 1956, now Patent No. 2,888,510 issued May 26, 1959.

The invention is illustrated in the accompanying drawings of which Fig. 1 is a plan view partly in section of a twin cable end.

Figs. 2, 3, 4 and 5 are sections respectively on the lines 2—2, 3—3, 4—4 and 5—5 of Fig. 1.

Fig. 6 is a view similar to Fig. 3 showing a slight modification.

The cable consists of two cables 11 and 12 each consisting for example of three stranded cores 13, 14 and 15, the cores 15 being encased in a perforated rubber or other sheath 19 to prevent abrasion of the strands of the cores. The cables are encased in a flexible rubber or like insulating sheath 17 being separated from each other by an internal diametrical insulating web 18 whilst flexible coolant tubes 22 extend along the length of each cable.

Towards the end of the cable where the connection is to be made to a welding gun or a transformer, the rubber sheath 17 terminates and there is placed in the sheath a pair of copper tubes 23 and 24 each over a portion of its length 20 being semi-cylindrical as shown in Fig. 2 and opening out into a circular cross-section as shown at 21 in Fig. 5, the two tubes being laid back-to-back and separated by a thin terminal portion 26 of insulating web 18. In changing from the semi-cylindrical to the circular cross-section the tubes are bent away from each other, for example, at an angle of 30°, to form a Y, as shown clearly in Fig. 1. The individual cables 11 and 12 divide at this point and each is encased in a separate flexible rubber or like insulating sheath 30.

Each terminal connector consists of a copper tube 32 into which is placed a short copper block 33 having legs 34 to divide the tube into three zones. Each cable is placed in a tube, with the coolant tube terminating at and lying within the block 33. The cores 13, 14 and 15 pass on either side of and through the limbs 34 and extend to the end of the tube 32.

The tube 32 is then deformed symmetrically about the centre line in a power press so that the flat end presents a solid connector which is drilled at 36 for attachment to a transformer or a welding gun. The connector is further drilled at 35 to give access to the coolant tube 22.

Each cable therefore, after it leaves the Y-tube is flexible over a short portion of its length to enable it to be manipulated for attachment to a terminal, particularly where the terminals to which the cable are to be connected are spaced apart.

The flexible insulating sheaths are secured to the terminal connectors and to the Y-tube by clips 38.

In Fig. 6 is shown a modification of the cable of Fig. 3 in which the web 18' is formed integrally with the sheath 17', rather than being a separate member as shown by web 18 in Fig. 3.

The above describes the terminal connectors at one end of the cable. The opposite end may be constructed similarly or may, if desired, have the form shown and described in my copending application, Serial No. 566,683, filed February 20, 1956, now Patent No. 2,888,510, issued May 26, 1959.

By means of this invention there is eliminated the need for separate flexible conductors or jumpers, to connect the cable to the terminals of a welding machine or transformer, thus greatly simplifying the connection and reducing the number of bolted faces through which the welding current has to pass, with a consequent increase in efficiency.

By the elimination of separate jumpers the cable is much lighter in weight and less cumbersome, thus making it much easier to manipulate, with less fatigue to the operators and hence increased productivity.

I claim:

1. A welding cable structure, comprising a pair of cables, each of said cables including a plurality of wire cores, said cables being encased in a flexible sheath and wholly separated from each other by an internal diametral flexible insulating web; a pair of flexible coolant tubes respectively disposed along the cables and in contact with each of the cores thereof for cooling the same; a pair of metal tubes respectively enclosing a portion of each cable and coolant tube, said metal tubes being semi-cylindrical in form for portions of their length, said semi-cylindrical portions having flat sides juxtaposed with said web disposed therebetween, said tubes having further portions cylindrical in form and angularly disposed to each other beyond said web and sheath, said sheath enclosing the semi-cylindrical portions of said metal tubes holding them together; flexible insulation sheaths connected to ends of the cylindrical portions of the metal tubes, one of said cables and one of said coolant tubes extending through each of said metal tubes and each of said flexible insulation sheaths, said cables and coolant tubes terminating in connectors secured to the respective flexible insulation sheaths, whereby said cables are cooled throughout their lengths by said coolant tubes while being yieldingly retained at terminal portions thereof in general Y-configuration by said sheaths.

2. A welding cable structure according to claim 1, wherein said web is integrally formed with said sheath.

References Cited in the file of this patent

UNITED STATES PATENTS

| | | |
|---|---|---|
| 327,475 | Spalding | Sept. 29, 1885 |
| 786,911 | Miles et al. | Apr. 11, 1905 |
| 1,706,412 | Roberts | Mar. 26, 1929 |
| 1,971,626 | Simmons | Aug. 28, 1934 |
| 2,256,027 | Jardine | Sept. 16, 1941 |
| 2,427,518 | Bergan | Sept. 16, 1947 |
| 2,691,691 | Wreford | Oct. 12, 1954 |
| 2,752,412 | Wreford et al. | June 26, 1956 |

FOREIGN PATENTS

| | | |
|---|---|---|
| 643,819 | Germany | Apr. 17, 1937 |
| 986,385 | France | Mar. 21, 1951 |